US008615105B1

(12) United States Patent
Cheng et al.

(10) Patent No.: US 8,615,105 B1
(45) Date of Patent: Dec. 24, 2013

(54) OBJECT TRACKING SYSTEM

(75) Inventors: Shinko Yuanhsien Cheng, West Hills, CA (US); Jose M. Molineros, Encino, CA (US); Yuri Owechko, Newbury Park, CA (US); Swarup S. Medasani, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 530 days.

(21) Appl. No.: 12/872,183

(22) Filed: Aug. 31, 2010

(51) Int. Cl.
*G06K 9/00* (2006.01)

(52) U.S. Cl.
USPC ........................................................ 382/103

(58) Field of Classification Search
USPC .......................................... 382/103; 348/169
See application file for complete search history.

(56) References Cited

U.S. PATENT DOCUMENTS

| | | | | |
|---|---|---|---|---|
| 4,868,871 | A * | 9/1989 | Watson, III .................... | 382/103 |
| 7,558,762 | B2 | 7/2009 | Owechko et al. | |
| 7,587,064 | B2 | 9/2009 | Owechko et al. | |
| 7,599,894 | B2 | 10/2009 | Owechko et al. | |
| 7,636,700 | B2 | 12/2009 | Owechko et al. | |
| 7,672,911 | B2 | 3/2010 | Owechko et al. | |
| 2004/0130620 | A1* | 7/2004 | Buehler et al. ................ | 348/143 |
| 2007/0263900 | A1 | 11/2007 | Medasani et al. | |
| 2009/0245573 | A1* | 10/2009 | Saptharishi et al. .......... | 382/103 |
| 2009/0315996 | A1* | 12/2009 | Guler et al. .................... | 348/169 |
| 2010/0166262 | A1* | 7/2010 | Wedge ........................... | 382/103 |
| 2010/0290668 | A1* | 11/2010 | Friedman et al. ............. | 382/103 |
| 2011/0081043 | A1* | 4/2011 | Sabol et al. .................... | 382/103 |
| 2011/0169943 | A1* | 7/2011 | Bachman et al. ............. | 348/117 |

OTHER PUBLICATIONS

Birchfield et al., "Spatiograms Versus Histograms for Region-Based Tracking", 2005, IEEE Conference on Computer Vision and Pattern Recognition (CVPR) San Diego, CA Jun. 2005.
Comaniciu, "Mean Shift: A Robust Approach Toward Feature Space Analysis", IEEE Transactions on Pattern Analysis and Machine Intelligence, vol. 2, No. 5, May 2002, pp. 603-619.
Zhou et al., "Object tracking using SIFT features and mean shift", Computer Vision and Image Understanding 113 (2009) pp. 345-332.
Dollar et al., "Pedestrian Detection: A Benchmark", IEEE 2009, pp. 304-311.
Conaire et al., "Thermo-Visual Feature Fusion for Object Tracking Using Multiple Spatiogram Trackers", Machine Vision and Applications, Dublin Ireland, Mar. 2007, pp. 1-12.
Cheng et al., "Video-Based Obstacle Detection for Coordinated Machines", Fourth IFAC International Workshop on Bio-Robotics, Information Technology and Intelligent Control for Bioproduction Systems, Sep. 2009, pp. 1-6.
Ben-Israel, "Tracking of Humans Using Masked Histograms and Mean Shift", pp. 1-8, retrieved Jul. 2010 http://opencvdotnet.googlecode.com/files/Tracking%20of%20Humans%20 Using%Masked%20 Histograms%20and%20Mean%20Shift.pdf.
Nejhum et al., "Visual Tracking with Histograms and Articulating Blocks", 2008, pp. 1-8, retrieved from: http://faculty.ucmerced.edu/mhyang/papers/cvpr08a.pdf.
Conaire et al., "An Improved Spatiogram Similarity Measure for Robust Object Localisation", pp. I-1069-I-1072 IEEE International Conference on Acoustics, Speech and Signal Processing, 2007, vol. 1, ICASSP 2007. Honolulu, HI.
Sreejisha V K, "Object Tracking in Video Sequences", Submitted to Department of Computer Science—Cochin University of Science and Technology, KOCHI, 2008, pp. 1-23.

\* cited by examiner

*Primary Examiner* — Shervin Nakhjavan
(74) *Attorney, Agent, or Firm* — Yee & Associates, P.C.

(57) ABSTRACT

A method, apparatus, and computer program product for tracking objects. A number of objects is detected in an image to form a number of detected objects. A number of previously identified objects is searched for in the image using a number of signatures for the number of previously identified objects. A number of tracks for the objects is updated using the number of detected objects and a number of reidentified objects. The number of reidentified objects is from searching for the number of previously identified objects.

19 Claims, 13 Drawing Sheets

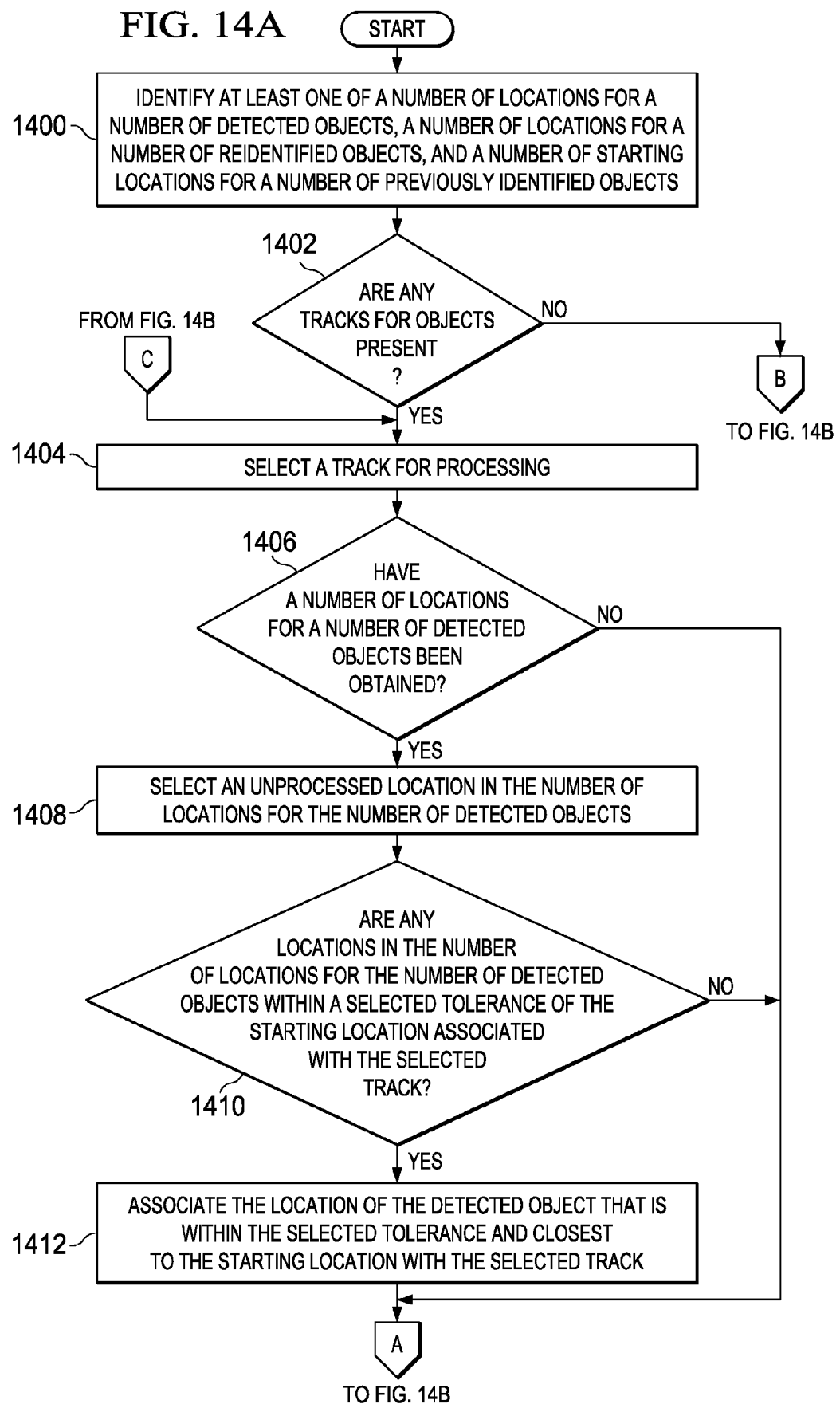

OBJECT TRACKING SYSTEM

BACKGROUND INFORMATION

1. Field

The present disclosure relates generally to processing images and, in particular, to processing images of moving objects. Still more particularly, the present disclosure relates to a method and apparatus for tracking moving objects in images.

2. Background

Cameras are commonly used to obtain video data of various areas. For example, cameras are present for monitoring traffic, stores, and other suitable areas. As another example, an unmanned aerial vehicle may be used to obtain video data for various targets. An unmanned aerial vehicle may be used to obtain video data of enemy forces, forest fires, terrain for surveying purposes, and/or other suitable types of targets.

One desirable feature in processing video data includes tracking a moving object over time. Video data includes images of an area in which each image is for a different point in time. A moving object may be tracked by an operator reviewing the video data. In other cases, a computer implemented process may be used to track the movement of an object in the video data.

Video tracking processes are used to identify target objects in different images over a period of time. Currently, objects in an image may be identified by extracting features from different portions of the image.

For example, the image may be analyzed by moving a window across the image. As the window moves, the image data in the window is analyzed to determine whether an object is present. After an object is identified in the image, the object may be tracked from image to image in video data in some manner. Tracking objects may require more processing resources than desired to track the movement of the objects in images in video data.

For example, with an unmanned aerial vehicle, surveillance may be performed to track a particular object, such as a ground vehicle. Tracking the movement of the ground vehicle may be desired to allow the unmanned aerial vehicle to fly in a manner that allows the unmanned aerial vehicle to continue to obtain video data for the ground vehicle. With this type of tracking of objects, additional resources on the ground or in other aircraft may be needed to track the ground vehicle.

For example, if the desired amount of processing resources is unavailable in the unmanned aerial vehicle, the video data may be transmitted to a remote site for processing. The result may then be returned to the unmanned aerial vehicle to allow the unmanned aerial vehicle to adjust flight of the unmanned aerial vehicle to continue tracking the ground vehicle. Additionally, this type of tracking may be made more difficult if the communications link used to transmit the video data does not have a desired amount of bandwidth or is lost.

Therefore, it would be advantageous to have a method and apparatus that takes into account at least some of the issues discussed above, as well as other possible issues.

SUMMARY

In one advantageous embodiment, a method is provided for tracking objects. A number of objects is detected in an image to form a number of detected objects. A number of previously identified objects is searched for in the image using a number of signatures for the number of previously identified objects. A number of tracks for the objects is updated using the number of detected objects and a number of reidentified objects. The number of reidentified objects is from searching for the number of previously identified objects.

In another advantageous embodiment, an apparatus comprises a sensor system and an object tracking system. The sensor system is configured to generate images of an area. The object tracking system is configured to detect a number of objects in an image to form a number of detected objects, search for a number of previously identified objects in the image using a number of signatures for the number of previously identified objects, and update a number of tracks for the objects using the number of detected objects and a number of reidentified objects from searching for the number of previously identified objects.

In yet another advantageous embodiment, a computer program product for tracking objects comprises a computer readable storage medium and program code, stored on the computer readable storage medium. Program code is present for detecting a number of objects in an image to form a number of detected objects. Program code is present for searching for a number of previously identified objects in the image using a number of signatures for the number of previously identified objects. Program code is present for updating a number of tracks for the objects using the number of detected objects and a number of reidentified objects. The number of reidentified objects is from searching for the number of previously identified objects.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIGS. 14A and 14B are illustrations of a flowchart of a process for tracking objects in images in accordance with an advantageous embodiment.

DETAILED DESCRIPTION

Figure 1:
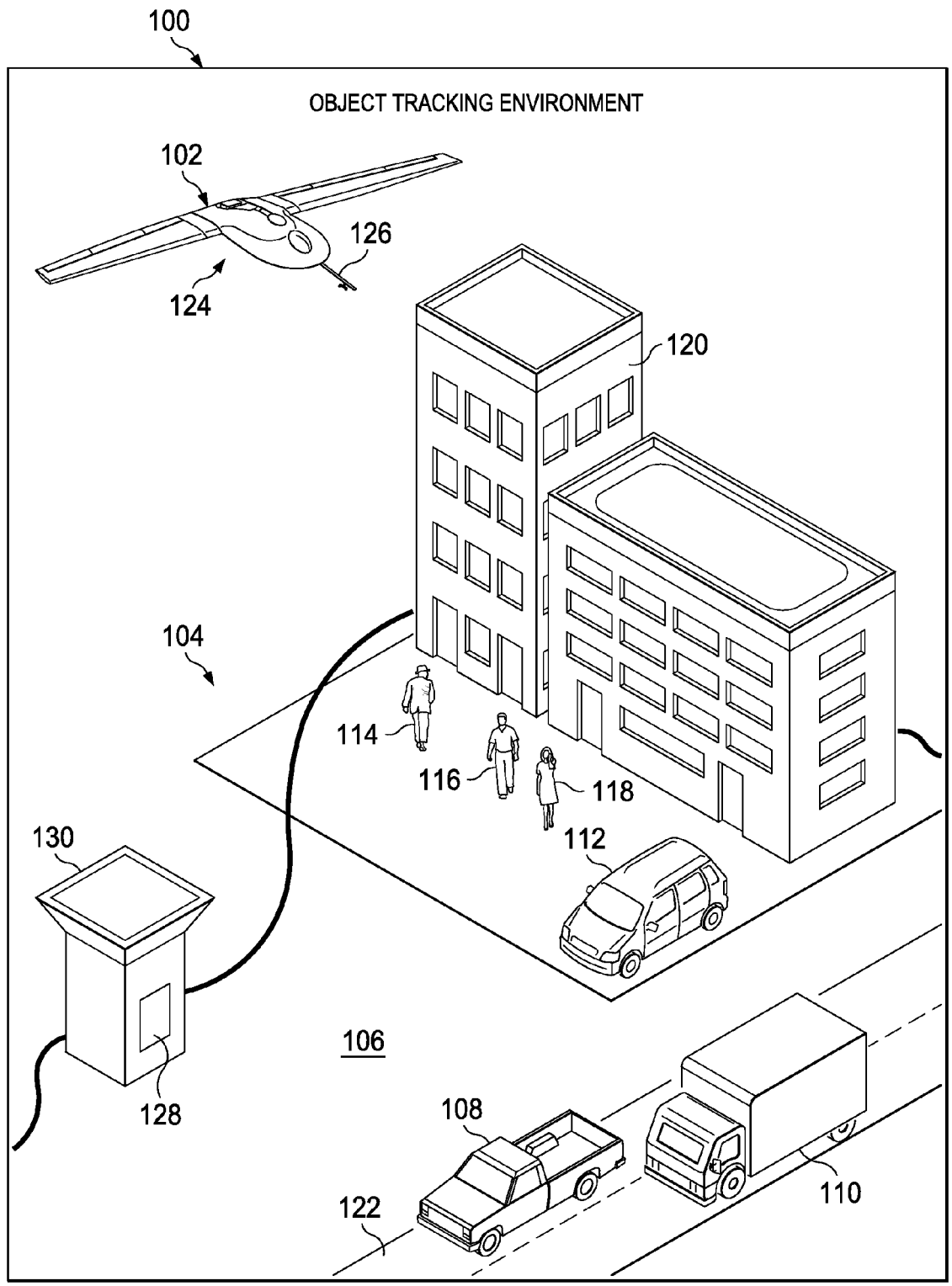
FIG. 1 is an illustration of an object tracking environment in accordance with an advantageous embodiment.

With reference now to FIG. 1, an illustration of an object tracking environment is depicted in accordance with an advantageous embodiment. In this illustrative example, object tracking environment 100 includes unmanned aerial vehicle 102, which flies over area 104 on ground 106. As depicted, vehicle 108, vehicle 110, and vehicle 112 are present in area 104. Person 114, person 116, and person 118 also are present in area 104.

Vehicle 108 and vehicle 110 travel on road 122 in area 104, while vehicle 112 is parked near building 120 in area 104. Person 114, person 116, and person 118 are moving around building 120 in this illustrative example.

Unmanned aerial vehicle 102 is part of object tracking system 124. In this depicted example, unmanned aerial vehicle 102 serves as a platform for camera 126. Unmanned aerial vehicle 102 generates video data using camera 126. In these illustrative examples, the video data may be sent to data processing system 128 at remote location 130. Data processing system 128 may process the video data to identify and track one or more objects, such as one or more of vehicle 108, vehicle 110, vehicle 112, person 114, person 116, and person 118.

In these illustrative examples, data processing system 128 may include processes, in accordance with an advantageous embodiment, that may reduce the processing resources needed to process the video data. In yet other illustrative examples, unmanned aerial vehicle 102 may include data processing system 128 and process the video data without transmitting this video data to remote location 130.

The different advantageous embodiments recognize and take into account a number of considerations with respect to tracking objects. The different advantageous embodiments recognize and take into account that using currently available processes for detecting objects to also track the objects may not be as efficient as desired. In other words, the different advantageous embodiments recognize and take into account that a process used to detect objects in an image may not perform as well in tracking an object once the object has been detected.

The different advantageous embodiments recognize and take into account that it would be advantageous to use one process for identifying objects of interest in an image and another process for tracking movement of objects in an image once objects have been identified.

Thus, the different advantageous embodiments provide a method and apparatus for tracking objects. In one advantageous embodiment, a number of objects is detected in an image to form a number of detected objects. A number of previously identified objects is searched for in the image using a number of signatures for the number of previously identified objects. A number of tracks for the objects is updated using the number of detected objects and a number of reidentified objects. The number of additional objects is from searching for the number of previously identified objects.

Figure 2:
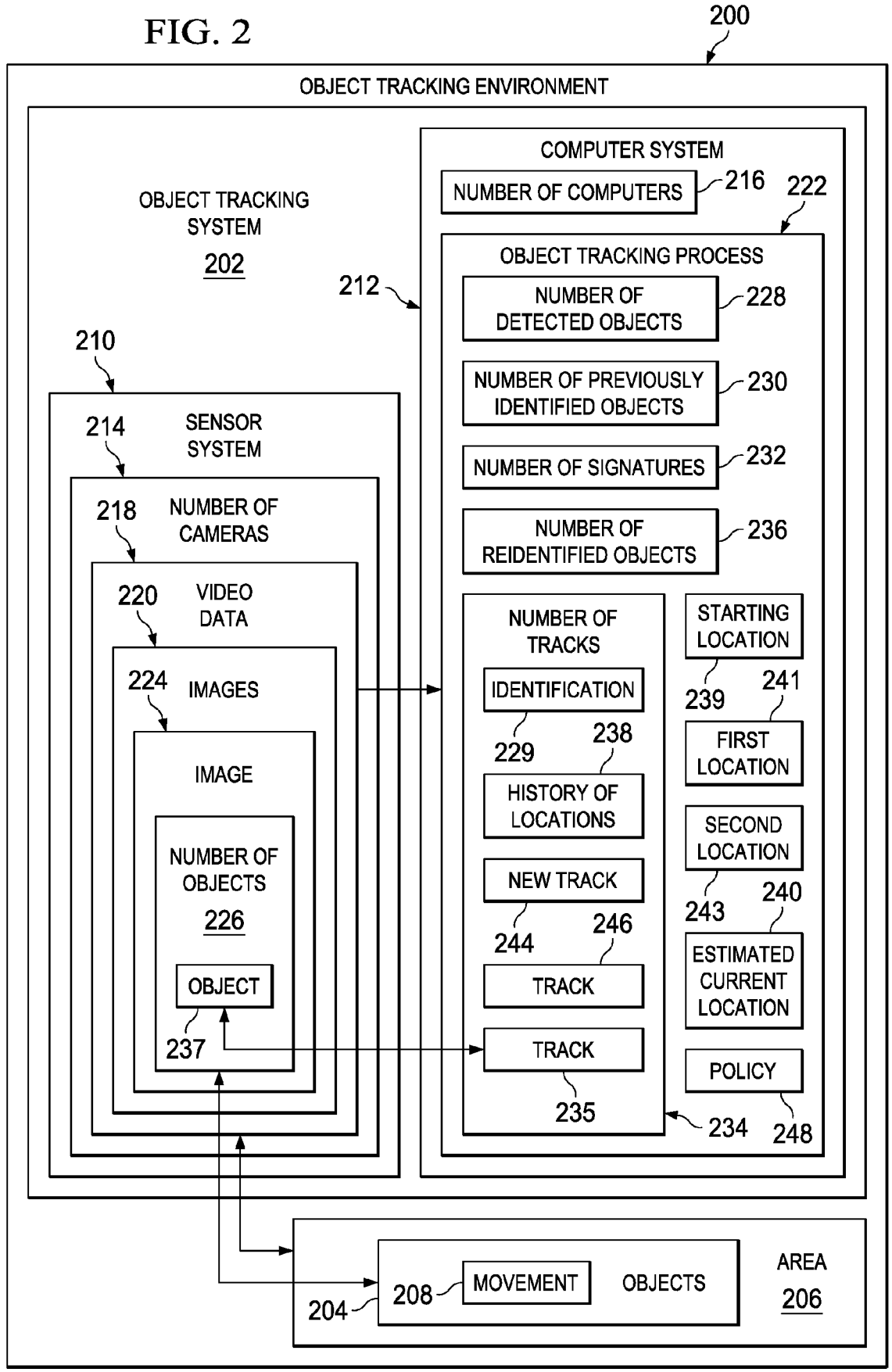
FIG. 2 is an illustration of an object tracking environment in accordance with an advantageous embodiment.

With reference now to FIG. 2, an illustration of an object tracking environment is depicted in accordance with an advantageous embodiment. Object tracking environment 100 in FIG. 1 is an example of one implementation for object tracking environment 200 in FIG. 2. As depicted, object tracking system 202 may be used to track objects 204 in area 206. Objects 204 may be tracked by detecting objects 204 in area 206 and then tracking movement 208 of objects 204 in area 206.

In these illustrative examples, an object in objects 204 may be selected from a group consisting of a person, an animal, a robot, an aircraft, a spacecraft, a vehicle, a ship, a submarine, a train, an automobile, and/or other suitable types of objects. Further, area 206 may be selected from one of a manufacturing facility, a field, a room, a hallway, a town, a valley, a city, a portion of airspace, a body of water, a portion of a road, an airport, and/or some other suitable type of area.

As depicted, object tracking system 202 comprises sensor system 210 and computer system 212. In this example, sensor system 210 includes number of cameras 214. A number of items, as used herein, means one or more items. For example, a number of cameras may be one or more cameras.

Computer system 212 comprises number of computers 216. Computers within number of computers 216 may be in communication with each other through various types of communications links. These communications links may include wireless and/or wired communications links.

Number of cameras 214 generates video data 218. Video data 218 comprises images 220. Object tracking process 222 runs on computer system 212 to process images 220 in video data 218 to track objects 204 detected in images 220.

In these illustrative examples, object tracking process 222 may take the form of program code run by processor units and computer system 212. In other illustrative examples, object tracking process 222 may be embodied in hardware or a combination of hardware and program code.

Images 220 have an order based on a time at which each of images 220 was generated by number of cameras 214. In these illustrative examples, object tracking process 222 processes images 220 sequentially based on the time at which images 220 were generated.

In processing image 224 in images 220, object tracking process 222 detects number of objects 226 in image 224. Number of objects 226 may include all of objects 204 or a subset of objects 204 in area 206. The detection of number of objects 226 forms number of detected objects 228.

Object tracking process 222 also searches image 224 for number of previously identified objects 230. A previously identified object in number of previously identified objects 230 is an object that has been previously detected in images 220 and is associated with a signature in number of signatures 232. In other words, an identified object is an object that has been detected in an image in images 220 and for which a signature has been created and associated with the object.

The search for number of previously identified objects 230 is performed using number of signatures 232 for number of previously identified objects 230. In other words, each previously identified object in number of previously identified objects 230 is associated with a signature in number of signatures 232.

Each signature in number of signatures 232 is a signature that is configured to allow for the tracking of the identified object even when the object has different configurations in different images in images 220. For example, when the identified object is a person that was detected standing up, object tracking process 222 may not detect the person in another image in which the person is bending over or raising an arm.

However, object tracking process 222 may be configured to track the person using the signature associated with the person. As a result, if a previously identified object changes orientation or configuration, that object may still be identified by object tracking process 222 even when the object is not detected. In this manner, object tracking process 222 uses number of signatures 232 to locate previously identified objects.

In these illustrative examples, each object in image 224 that is reidentified from searching image 224 for number of previously identified objects 230 becomes one of number of reidentified objects 236. Number of reidentified objects 236 may include one, some, or all of number of previously identified objects 230.

Further, in these examples, a detected object in number of detected objects 228 may be the same object as a previously identified object in number of previously identified objects 230. Additionally, a detected object in number of detected objects 228 may be the same object as a reidentified object in number of reidentified objects 236. In other words, an object that is reidentified in image 224 to become one of number of reidentified objects 236 may be the same object as a detected object in number of detected objects 228.

In these illustrative examples, both the detecting and searching steps are performed by object tracking process 222 each time an image in images 220 is processed by object tracking process 222. In this manner, the different illustrative examples may be more likely to reidentify objects by both detecting objects in image 224 and attempting to reidentify a previously identified object in image 224.

In these examples, the searching step for reidentifying objects may not be performed for the first image in the order of images 220 because no objects may have been previously identified prior to processing of the first image in the order of images 220.

Object tracking process 222 maintains number of tracks 234 for objects 204. A track comprises information that is associated with an object in these illustrative examples. A track may comprise, for example, without limitation, a data structure, an entry in a file, a database entry, or some other suitable type of organization of information about an object.

Each track in number of tracks 234 is associated with an object that has been previously identified. In this manner, each of number of previously identified objects 230 is associated with a track in number of tracks 234. As a result, a track in number of tracks 234 is created every time that a new object is detected in an image. A new object is an object that has not been previously identified in images 220. In other words, a new object is an object that is not in number of previously identified objects 230.

Additionally, each track in number of tracks 234 comprises identification 229 of an object and history of locations 238 for the object. History of locations 238 for each object comprises a current location for the object in a current image being processed and a prior location for the object in an image processed prior to the current image. In some illustrative examples, history of locations 238 may include more than one prior location for the object.

In these illustrative examples, object tracking process 222 updates number of tracks 234 using number of detected objects 228 and/or number of reidentified objects 236. For example, a track in number of tracks 234 may be updated when a previously identified object in number of previously identified objects 230 is reidentified and/or when an object is detected in image 224 to form a detected object in number of detected objects 228. Further, a previously identified object in number of previously identified objects 230 that is not found when searching image 224 for the previously identified object may also be used to update number of tracks 234.

As one illustrative example, updating track 235 in number of tracks 234 associated with object 237 in number of objects 226 includes using at least one of starting location 239, first location 241, and second location 243 to generate estimated current location 240 for object 237 in image 224. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Starting location 239 is a location identified from updating track 235 for object 237 based on detecting and/or finding object 237 in prior images to image 224 in images 220. First location 241 is the location in which object 237 is detected in image 224. Second location 243 is the location in which object 237 is reidentified from searching for object 237 in image 224.

Estimated current location 240 may be used as a starting location for searching for object 237 in an image subsequent to image 224. More specifically, estimated current location 240 is used by object tracking process 222 as the location in an image subsequent to image 224 to begin searching for the object using a signature in number of signatures 232 for the object.

Additionally, in updating number of tracks 234, object tracking process 222 attempts to associate number of detected objects 228 with number of tracks 234. In other words, object tracking process 222 determines whether a detected object in number of detected objects 228 has a track in number of tracks 234.

If any detected objects are present in number of detected objects 228 that do not have a track in number of tracks 234, object tracking process 222 creates new track 244 for these detected objects. In a similar fashion, track 246 in number of tracks 234 may be removed if a detection and reidentification of the object associated with track 246 is not formed in number of detected objects 228 and in number of previously identified objects 230, respectively.

In other words, the removal of track 246 may occur if the object associated with the track has not been detected and reidentified for some selected period of time. The selected period of time may vary using policy 248. For example, if the selected period of time is greater than some threshold identified by policy 248, track 246 is removed.

In these illustrative examples, both object detection and object tracking are used in object tracking process 222 for tracking objects. By using both types of processes, an object that may be lost by a tracking process may be redetected using a detection process. In a similar fashion, reliance on a detection process to identify an object each time is supplemented through the use of object tracking.

With these and other features that are described in this figure and in the following figures, the different advantageous embodiments may increase the accuracy with which objects may be tracked. Additionally, the different advantageous embodiments also may reduce the processing resources and/or power needed to track objects.

Figure 3:
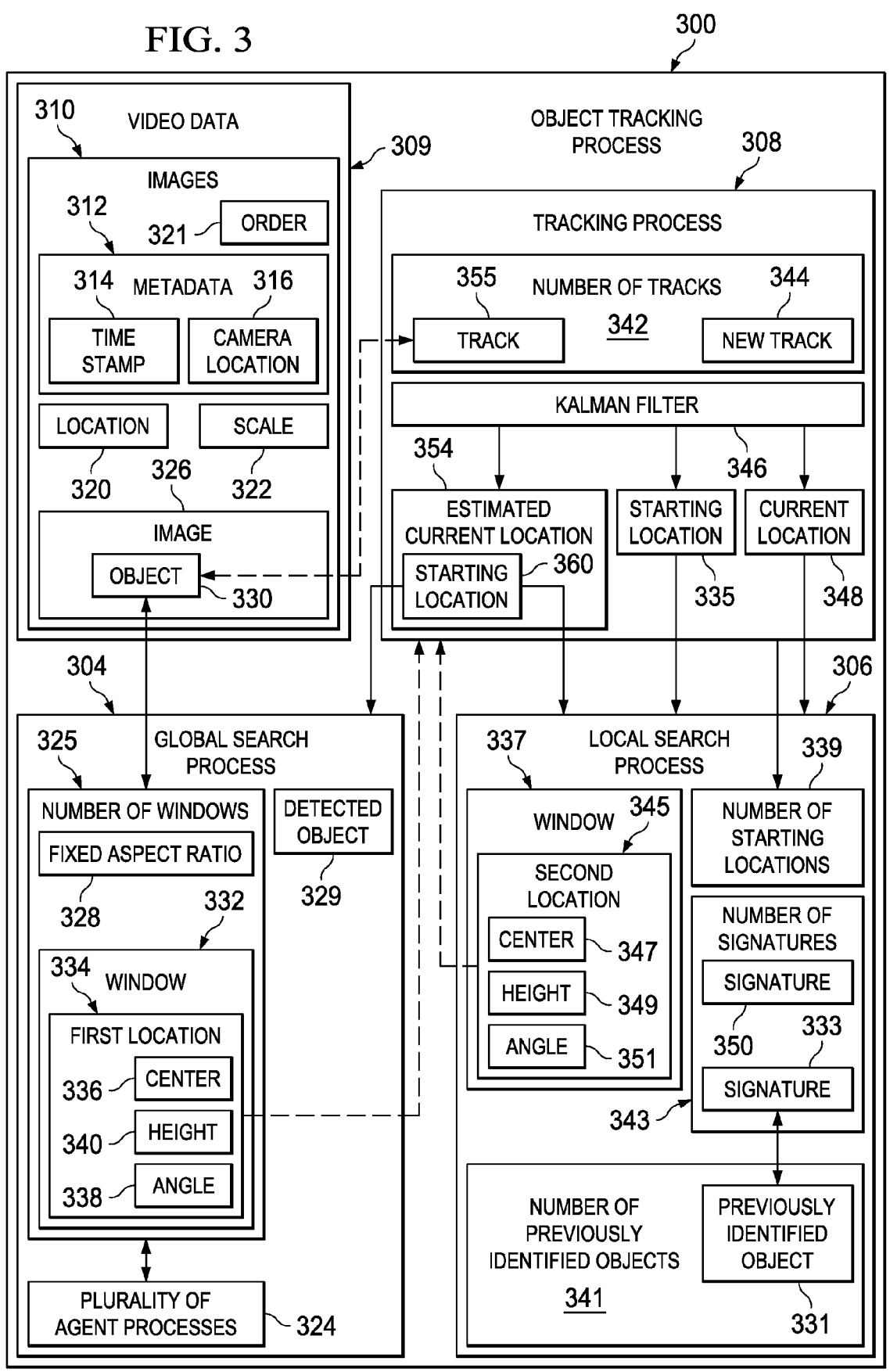
FIG. 3 is an illustration of an object tracking process in accordance with an advantageous embodiment.

With reference now to FIG. 3, an illustration of an object tracking process is depicted in accordance with an advantageous embodiment. In this example, object tracking process 300 is an example of one implementation for object tracking process 222 in FIG. 2.

As depicted, object tracking process 300 includes global search process 304, local search process 306, and tracking process 308. Object tracking process 300 tracks objects, such as objects 204 in FIG. 2, using video data 309. Video data 309 is an example of video data 218 in FIG. 2.

In this illustrative example, video data 309 includes images 310 and metadata 312. Metadata 312 describes images 310. For example, metadata 312 may include time stamp 314 and camera location 316. Time stamp 314 may be used to identify order 321 for images 310 based on a time when images 310 were generated. Camera location 316 may be used to identify location 320 and/or scale 322 of objects in images 310.

In these illustrative examples, global search process 304 detects objects in images 310. Global search process 304 uses plurality of agent process 324 to detect objects in images 310. Each agent process in plurality of agent processes 324 is configured to detect objects in images 310 and cooperate with other agent processes in plurality of agent processes 324 to detect the objects.

Additionally, each agent process in plurality of agent processes 324 may detect objects within number of windows 325. Each window in number of windows 325 has fixed aspect ratio 328 for a height and width for each window in these illustrative examples. As one illustrative example, a window may have, without limitation, a rectangular shape in which a height and width for the window have fixed aspect ratio 328.

For example, using plurality of agent processes 324, global search process 304 detects object 330 within window 332 in image 326 to form detected object 329. Global search process 304 identifies first location 334 for window 332 in image 326. First location 334 includes center 336, angle 338, and height 340 of window 332. Center 336 may be an x, y location in pixels for a center of window 332 in image 326, for example. In other illustrative examples, first location 334 for window 332 may also include wavelength, polarization state, and/or other suitable characteristics for image 326.

Global search process 304 sends first location 334 to tracking process 308. Of course, global search process 304 may send additional information about object 330 and/or window 332 to tracking process 308.

Local search process 306 searches images 310 for number of previously identified objects 341 using number of signatures 343. Number of signatures 343 takes the form of a number of spatiograms in these examples. Each spatiogram is associated with a previously identified object being tracked by tracking process 308.

In these illustrative examples, a spatiogram is a model of the appearance of a selected region in an image in images 310. For example, a spatiogram captures the probability density function (PDF) of the data in the image in a region of interest in the image. A spatiogram is a histogram that includes additional information, such as mean and covariance, about the pixels that make up each bin in the histogram.

As a result, local search process 306 may search for number of previously identified objects 341 in all of images 310, except for the first image in order 321 for images 310. Further, local search process 306 searches for number of previously identified objects 341 beginning in number of starting locations 339 for number of previously identified objects 341. Number of starting locations 339 may be obtained from tracking process 308.

Additionally, local search process 306 may search for a previously identified object within a window positioned at a starting location in number of starting locations 339. Local search process 306 may also search for the previously identified object within a window positioned at locations around the starting location.

For example, when object 330 is previously identified object 331, local search process 306 searches for previously identified object 331 in image 326 using signature 333 for object 330. In particular, local search process 306 begins searching for previously identified object 331 within window 337 positioned at starting location 335 for object 330 obtained from tracking process 308. Window 337 may take, for example, an elliptical shape in these examples. Further, local search process 306 may move window 337 around starting location 335 to search for previously identified object 331.

In these illustrative examples, when local search process 306 reidentifies previously identified object 331 in image 326, local search process 306 identifies second location 345 for window 337 in image 326 for where previously identified object 331 was found. Second location 345 includes center 347, height 349, and angle 351. Center 347 is the center of window 337 in which previously identified object 331 was reidentified. Local search process 306 sends second location 345 to tracking process 308.

In some illustrative examples, local search process 306 may find object 330 in image 326 when global search process 304 does not detect object 330. Further, global search process 304 may detect object 330 when local search process 306 does not find object 330.

When tracking process 308 receives first location 334 for object 330, tracking process 308 determines whether object 330 is a new object. Object 330 is a new object when object 330 is not associated with a track in number of tracks 342. If object 330 is a new object, tracking process 308 creates new track 344 for object 330.

Further, when object 330 is a new object, tracking process 308 sends first location 334 into Kalman filter 346 to form current location 348. Current location 348 is first location 334 in these examples. Tracking process 308 sends current location 348 to local search process 306. Local search process 306 forms signature 350 for object 330 based on current location 348. Signature 350 is associated with new track 344. Signature 350 may be referred to as a reference signature for object 330.

Additionally, when object 330 is previously identified object 331, tracking process 308 updates track 355 associated with object 330 after image 326 is processed by global search process 304 and local search process 306. Depending on whether object 330 is detected and/or reidentified in image 326, tracking process 308 sends at least one of first location 334, second location 345, and starting location 335 to Kalman filter 346 to update track 355. Starting location 335 is the location at which object 330 is predicted to be in image 326 based on a previous identification of object 330 in a prior image.

Kalman filter 346 uses this information to generate estimated current location 354 for object 330 in image 326. In these examples, Kalman filter 346 may be different for each track in number of tracks 342. In these illustrative examples, estimated current location 354 is stored in track 355. Further, estimated current location 354 may be sent to global search process 304 and/or local search process 306 as starting location 360. Starting location 360 may be the starting location in a subsequent image to image 326 at which to begin detecting and/or searching for object 330. In this manner, tracks for the objects detected and/or identified in images 310 may be updated.

The illustration of object tracking environment 200 in FIG. 2 and object tracking process 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, sensor system 210 and computer system 212 in FIG. 2 may be located in a same location. For example, sensor system 210 and computer system 212 may be associated with the same platform. This platform may be a mobile platform, such as, for example, without limitation, an aircraft, an unmanned aerial vehicle, a spacecraft, a satellite, a ground vehicle, a train, and/or some other suitable type of platform. The platform may also take the form of a stationary platform, such as, for example, without limitation, a building, a bridge, a tower, a wall, a door, and/or some other suitable type of stationary platform.

In other illustrative examples, sensor system 210 and computer system 212 may be located in separate locations. In these examples, video data 218 may be sent to computer system 212 using wireless communications links and/or wired communications links. As another example, in some illustrative examples, object tracking process 222 may be configured to process video data for a number of areas in addition to area 206 at the same time.

Figure 4:
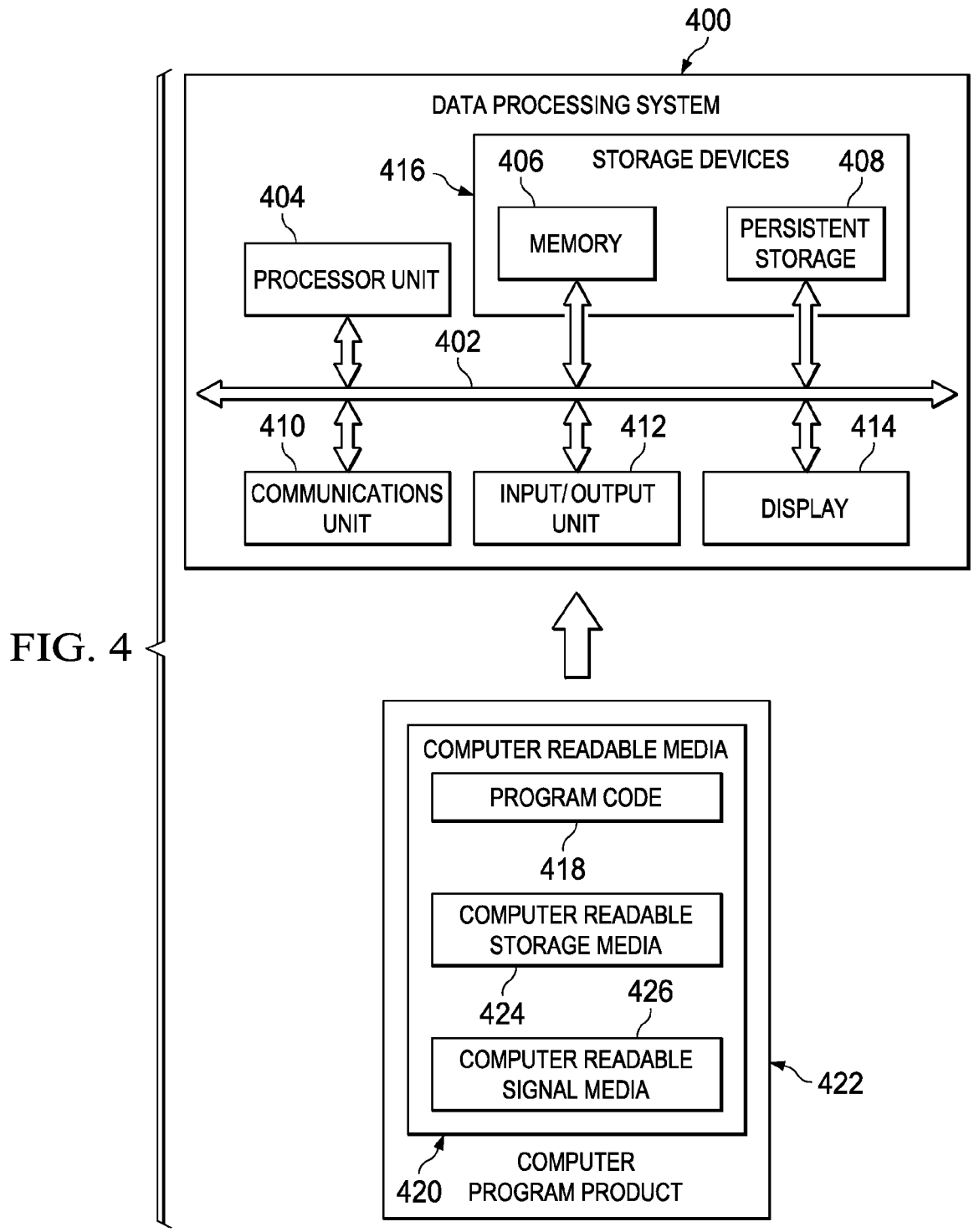
FIG. 4 is an illustration of a data processing system in accordance with an advantageous embodiment.

Turning now to FIG. 4, an illustration of a data processing system is depicted in accordance with an advantageous embodiment. In this illustrative example, data processing system 400 is an example of one implementation for a computer in number of computers 216 for computer system 212 in FIG. 2. As depicted, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these illustrative examples, computer readable storage media 424 is a non-transitory computer readable storage medium.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

Figure 5:
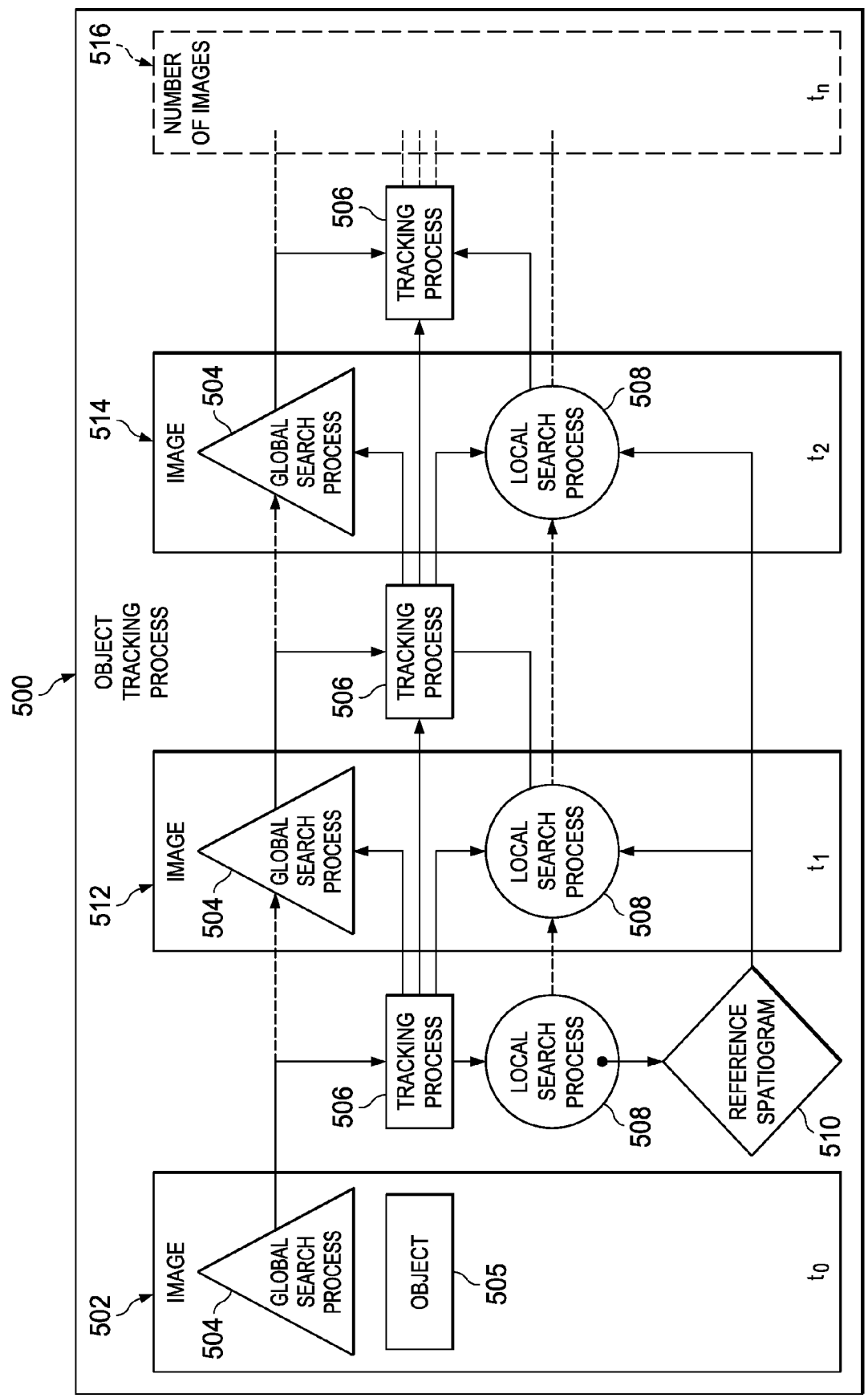
FIG. 5 is an illustration of an object tracking process in accordance with an advantageous embodiment.

With reference now to FIG. 5, an illustration of an object tracking process is depicted in accordance with an advantageous embodiment. In this illustrative example, object tracking process 500 is an example of one manner in which object tracking process 222 in FIG. 2 and/or object tracking process 300 in FIG. 3 may be implemented.

As depicted, object tracking process 500 receives image 502 and processes image 502. Image 502 may be the first image in a plurality of images received by object tracking process 500. For example, image 502 is an image generated at time t0 in this illustrative example. Time t0 is the first point in time at which an image is generated.

In this illustrative example, global search process 504 detects object 505 within image 502 to form a detected object. Object 505 is detected within a window having a location in image 502. Global search process 504 sends this location and/or other suitable information to tracking process 506.

Tracking process 506 sends the location obtained from global search process 504 into a Kalman filter to identify a current location for object 505. In this example, the current location output from the Kalman filter is the location obtained from global search process 504. Further, tracking process 506 uses the current location to create a new track for the object detected by global search process 504. The new track also includes an identification of object 505. With the generation of the new track for object 505, object 505 is an identified object.

In this illustrative example, tracking process 506 sends the current location to local search process 508. Local search process 508 forms reference spatiogram 510 for the object. In particular, reference spatiogram 510 for object 505 is formed based on the current location received from tracking process 506. Reference spatiogram 510 comprises a number of values for a number of attributes for object 505 from image 502. These attributes may include, for example, without limitation, intensity, color, and/or other suitable attributes.

Image 512 is an image that is subsequent to image 502. Object tracking process 500 processes image 512. In processing image 512, tracking process 506 sends the current location for the previously identified object, object 505, to global search process 504.

Global search process 504 uses the current location to begin re-detecting the previously identified object. Further, global search process 504 also searches for new objects in image 512 not previously identified in image 502. Global search process 504 sends the locations in image 512 at which global search process 504 detects objects in image 512 to tracking process 506.

Additionally, in processing image 512, tracking process 506 sends the current location for the previously identified object to local search process 508. Local search process 508 uses the current location as a starting location for searching for object 505 in image 512. Further, local search process 508 searches for the previously identified object using reference spatiogram 510.

For example, local search process 508 may begin generating spatiograms at the starting location in image 512 and around the starting location to search for object 505. Local search process 508 uses, in these examples, a mean-shift algorithm to find a spatiogram at a location in image 512 that matches reference spatiogram 510 within a selected tolerance. When a match is found, object 505 is reidentified. Local search process 508 then sends the location at which a match is found to tracking process 506.

Still further, in processing image 512, tracking process 506 updates the track created for object 505. In particular, tracking process 506 sends the current location for object 505 identified by tracking process 506 from processing image 502. Additionally, if object 505 is detected in image 512 using global search process 504, location for object 505 obtained from global search process 504 is also sent into the Kalman filter.

If object 505 is reidentified in image 514 using local search process 508, the location for object 505 obtained from local search process 508 is also sent into the Kalman filter. The Kalman filter is configured to generate an estimated current location for object 505 in image 512 using at least one of these three locations.

Which of the three locations are sent into the Kalman filter depends on whether object 505 is detected and/or reidentified in image 512. For example, if global search process 504 detects object 505 and local search process 508 reidentifies object 505, all three locations are sent into the Kalman filter.

However, if only one of detection of object 505 and reidentification of object 505 occurs, only the location corresponding to the detection or reidentification and the current location identified by tracking process 506 are sent into the Kalman filter. Further, if neither the detection of object 505 nor the reidentification of object 505 occurs, only the current location identified by tracking process 506 is sent into the Kalman filter.

The estimated current location generated by the Kalman filter for object 505 is then used as a starting location for global search process 504 and local search process 508 in processing image 514. Image 514 is an image subsequent to image 512. Further, the estimated current location is sent into the Kalman filter when tracking process 506 updates the track associated with object 505 during the processing of image 514.

In this illustrative example, object tracking process 500 may use the processes described above to process number of images 516 subsequent to image 514. Additionally, after processing image 512, the Kalman filter may be configured to predict a number of new locations for object 505 in image 514 and/or number of images 516 based on the estimated current location for object 505.

Figure 6:
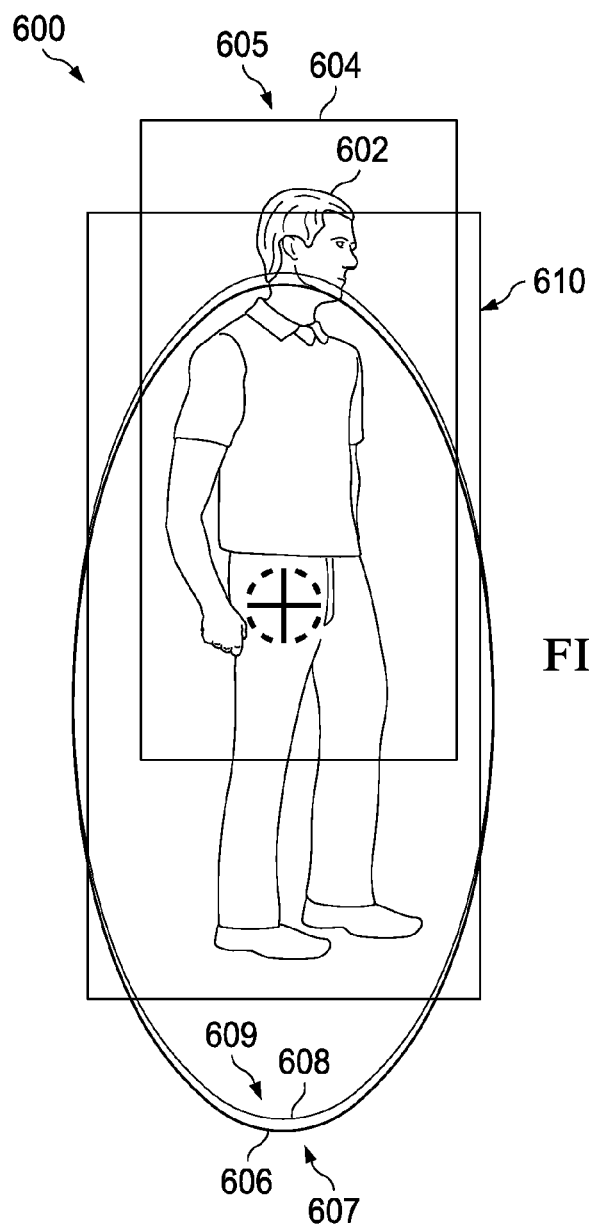
FIG. 6 is an illustration of an image of objects in accordance with an advantageous embodiment.

With reference now to FIG. 6, an illustration of an image of objects is depicted in accordance with an advantageous embodiment. In this illustrative example, image 600 is an example of one implementation for image 224 in FIG. 2 and/or image 326 in FIG. 3.

As depicted, person 602 is in image 600. Person 602 is an example of an object in number of objects 226 in FIG. 2. Further, person 602 is a previously identified object in this illustrative example. In other words, person 602 has been previously identified in an image generated prior to image 600. An object tracking process, such as object tracking process 222 in FIG. 2, object tracking process 300 in FIG. 3, and/or object tracking process 500 in FIG. 5, may be used to process image 600.

Window 604 is an example of window 332 in FIG. 3. As depicted, window 604 is positioned at location 605 in image 600. Location 605 is the location at which a global search process in the object tracking process detected person 602. Location 605 may be sent to a tracking process in the object tracking process.

Window 606 is positioned at starting location 607 in image 600. Starting location 607 is the location at which a local search process began searching for person 602 within window 606 in image 600. The local search process uses a reference spatiogram to search for person 602. Starting location 607 may be an estimate current location obtained from the tracking process.

Window 608 is positioned at location 609. Window 608 is an example of window 337 in FIG. 3. Location 609 is the location at which the local search process found person 602 using the reference spatiogram. In other words, the local search process identifies location 609 as the location at which the spatiogram generated for person 602 by the local search process matches the reference spatiogram for person 602 within a selected tolerance. Location 609 is sent to the tracking process.

In this illustrative example, the tracking process uses location 605, starting location 607, and location 609 to identify estimated current location 610 for person 602 in image 600.

Figure 7:
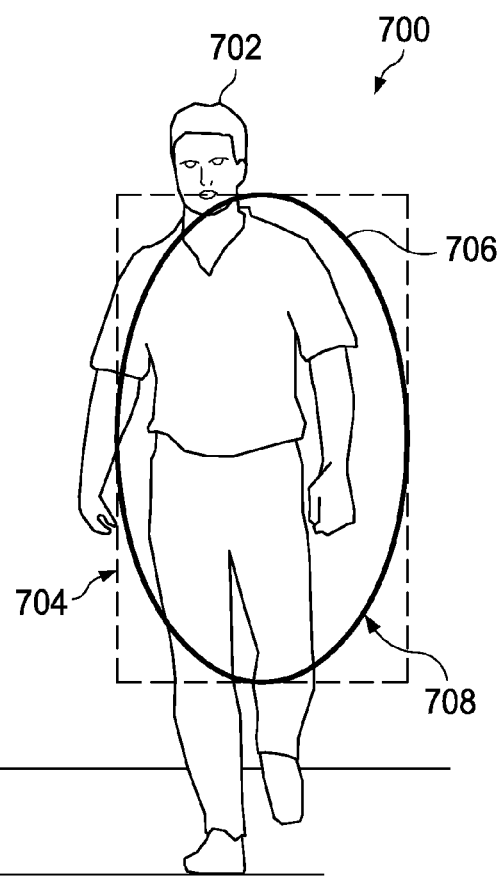
FIG. 7 is an illustration of an image processed using a local search process in accordance with an advantageous embodiment.

With reference now to FIG. 7, an illustration of an image processed using a local search process is depicted in accordance with an advantageous embodiment. In this illustrative example, image 700 may be processed using local search process 306 in FIG. 3 and/or local search process 508 in FIG. 5.

Person 702 is an object in image 700. Person 702 was detected by a global search process at location 704. This location is used by a tracking process to identify a current location for person 702. The local search process uses the current location obtained from the tracking process to form a reference spatiogram for person 702. A reference spatiogram for person 702 is formed using window 706 at location 708.

Figure 8:
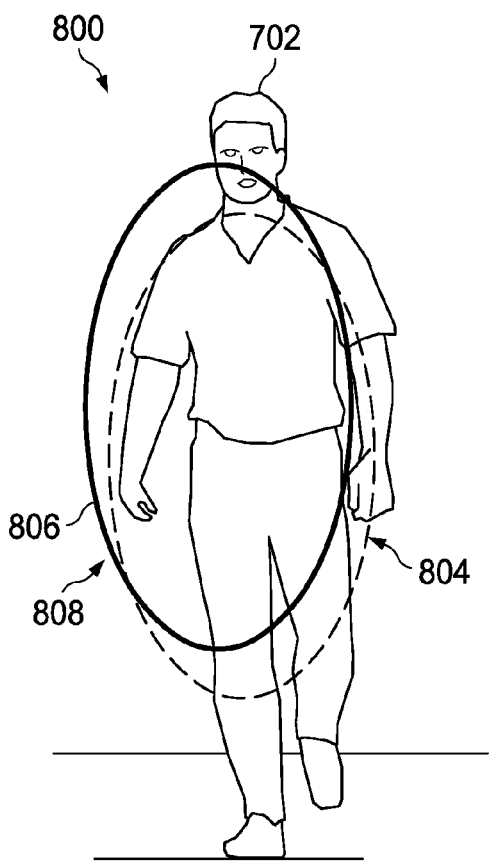
FIG. 8 is an illustration of an image processed using a local search process in accordance with an advantageous embodiment.

With reference now to FIG. 8, an illustration of an image processed using a local search process is depicted in accordance with an advantageous embodiment. In this illustrative example, image 800 may be processed using local search process 306 in FIG. 3 and/or local search process 508 in FIG. 5.

Person 702 in image 800 was previously identified in image 700 in FIG. 7. Starting location 804 is the location at which the local search process begins searching for person 702 in image 800. Starting location 804 is obtained from the tracking process. Starting location 804, in this example, is the same location as location 704 in FIG. 7. Location 808 for window 806 is the location at which the spatiogram generated for window 806 matches the reference spatiogram generated for person 702 within a selected tolerance.

Figure 9:
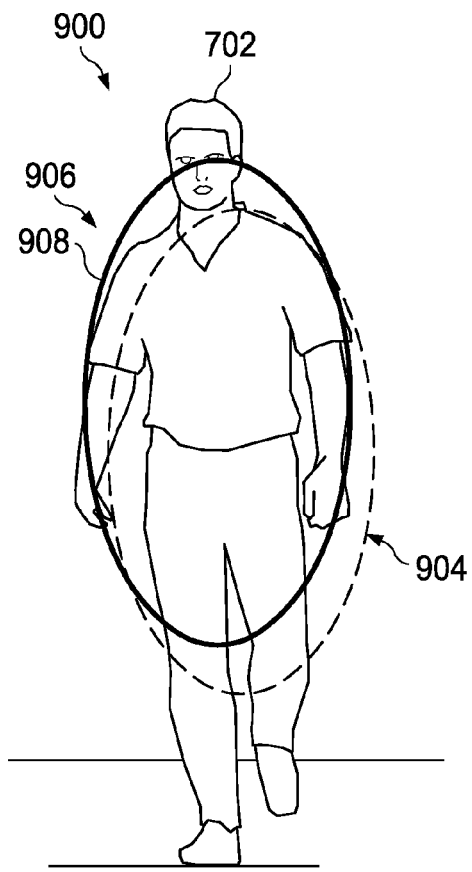
FIG. 9 is an illustration of an image processed using a local search process in accordance with an advantageous embodiment.

With reference now to FIG. 9, an illustration of an image processed using a local search process is depicted in accordance with an advantageous embodiment. In this illustrative example, image 900 may be processed using local search process 306 in FIG. 3 and/or local search process 508 in FIG. 5.

Person 702 in image 900 was previously identified in both image 700 in FIG. 7 and image 800 in FIG. 8. Starting location 904 is the location at which the local search process begins searching for person 702 in image 900. Starting location 904 is obtained from the tracking process. Location 906 for window 908 is the location at which the spatiogram generated for window 908 matches the reference spatiogram generated for person 702 within a selected tolerance.

Figure 10:
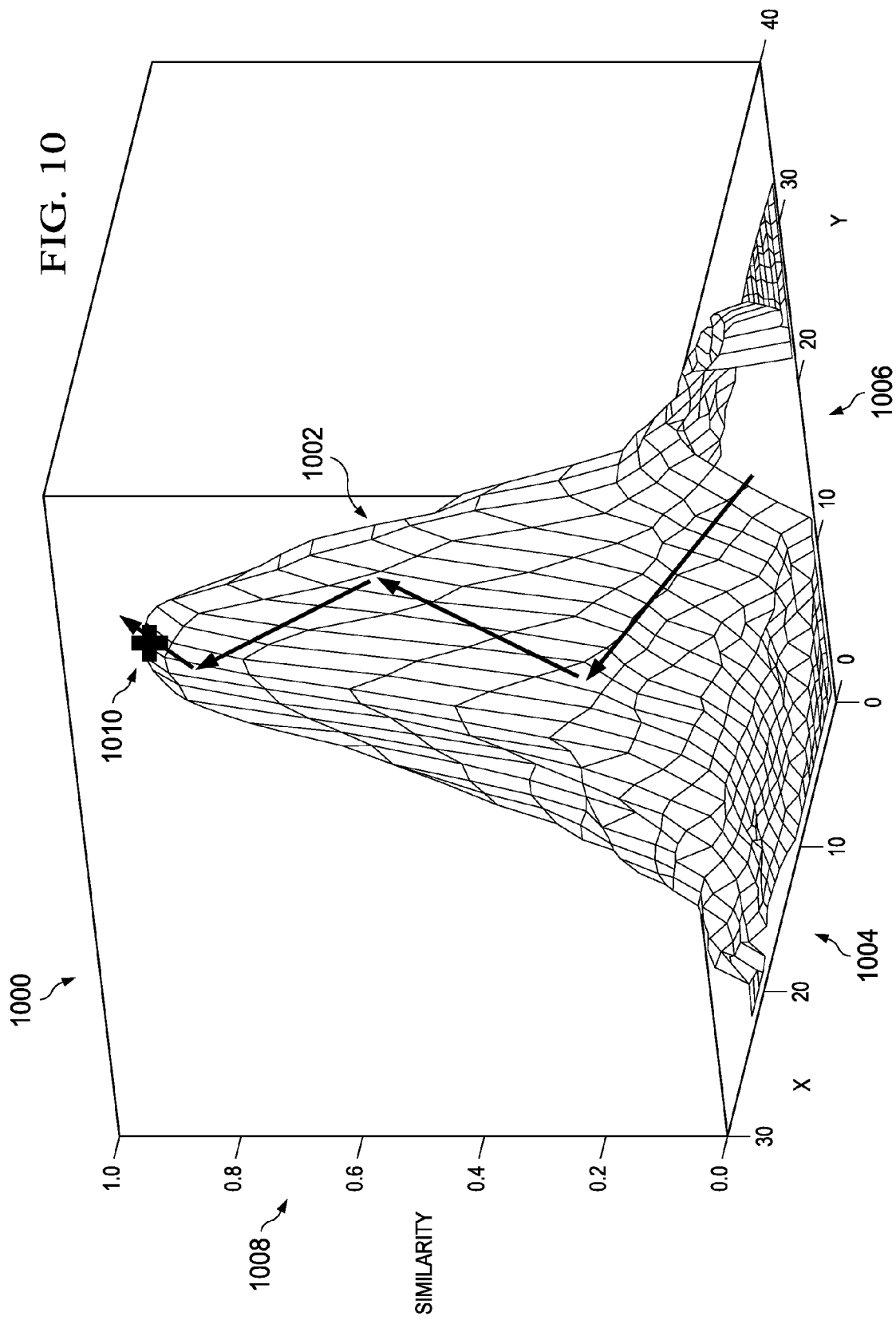
FIG. 10 is an illustration of a graph identifying a similarity surface in accordance with an advantageous embodiment.

With reference now to FIG. 10, an illustration of a graph identifying a similarity surface is depicted in accordance with an advantageous embodiment. In this illustrative example, graph 1000 identifies similarity surface 1002. Graph 1000 includes first axis 1004, second axis 1006, and third axis 1008.

First axis 1004 includes values for an x-coordinate for an x, y location in pixels in an image. Second axis 1006 includes values for a y-coordinate for an x, y location in pixels in an image. Third axis 1008 includes values that identify how similar a spatiogram is to other spatiograms.

Similarity surface 1002 identifies the similarity between a first spatiogram and a plurality of other spatiograms. This similarity is based on the values for the attributes identified in the spatiograms.

For example, the first spatiogram may be a reference spatiogram, such as reference spatiogram 510 in FIG. 5. The plurality of spatiograms is generated for various locations in the image. These locations are represented by first axis 1004 and second axis 1006.

Each point in similarity surface 1002 measures how close the reference spatiogram is to a spatiogram in the plurality of spatiograms at a particular location in the image. The closeness of the two spatiograms may be measured using, for example, Bhattacharyya coefficients. A Bhattacharyya coefficient is a measure of the amount of overlap or closeness between two statistical samples. In this illustrative example, similarity surface 1002 is a substantially smooth surface with a single peak having the maximum value.

The maximum peak for similarity surface 1002 may be used to identify the location in the image at which the spatiogram generated for that location matches the reference spatiogram within a selected tolerance. Further, similarity surface 1002 may be formed using a spatiogram mean-shift algorithm in these examples.

The mean-shift algorithm is an iterative process for identifying a maximum value of a function using data that is discretely sampled from the function. In these examples, the function is similarity surface 1002. In this manner, the mean-shift algorithm is used to identify maximum value 1010 for similarity surface 1002.

Figure 11:
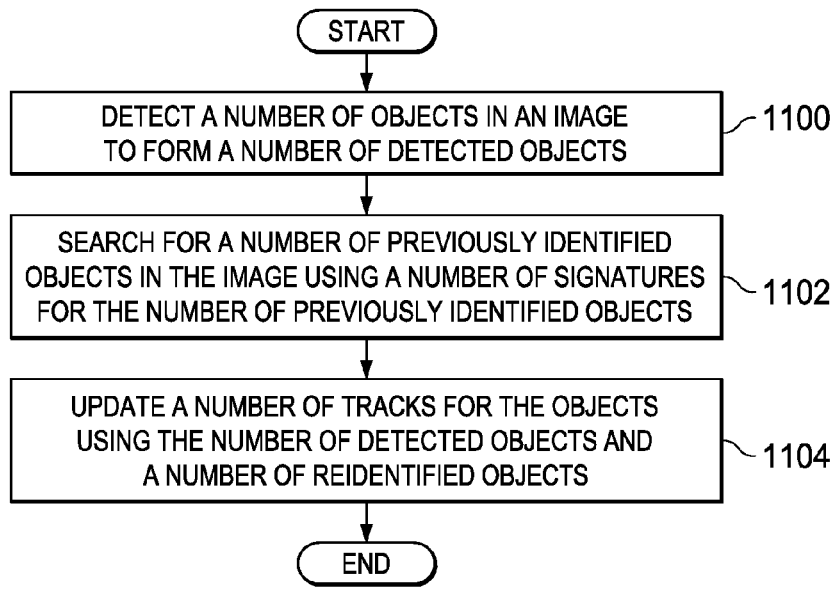
FIG. 11 is an illustration of a flowchart of a process for tracking objects in images in accordance with an advantageous embodiment.

With reference now to FIG. 11, an illustration of a flowchart of a process for tracking objects in images is depicted in accordance with an advantageous embodiment. The process illustrated in FIG. 11 may be implemented in object tracking environment 200 using object tracking system 202 in FIG. 2. In particular, this process may be implemented using object tracking process 222 in FIG. 2 and/or object tracking process 300 in FIG. 3.

The process begins by detecting a number of objects in an image to form a number of detected objects (operation 1100). Operation 1100 may be performed using, for example, global search process 304 in FIG. 3.

Next, the process searches for a number of previously identified objects in the image using a number of signatures for the number of previously identified objects (operation 1102). Operation 1102 may be performed using, for example, local search process 306 in FIG. 3.

Thereafter, the process updates a number of tracks for the objects using the number of detected objects and a number of reidentified objects (operation 1104), with the process terminating thereafter. The number of reidentified objects is from searching for the number of previously identified objects. Operation 1104 may be performed using, for example, tracking process 308 in FIG. 3.

Figure 12:
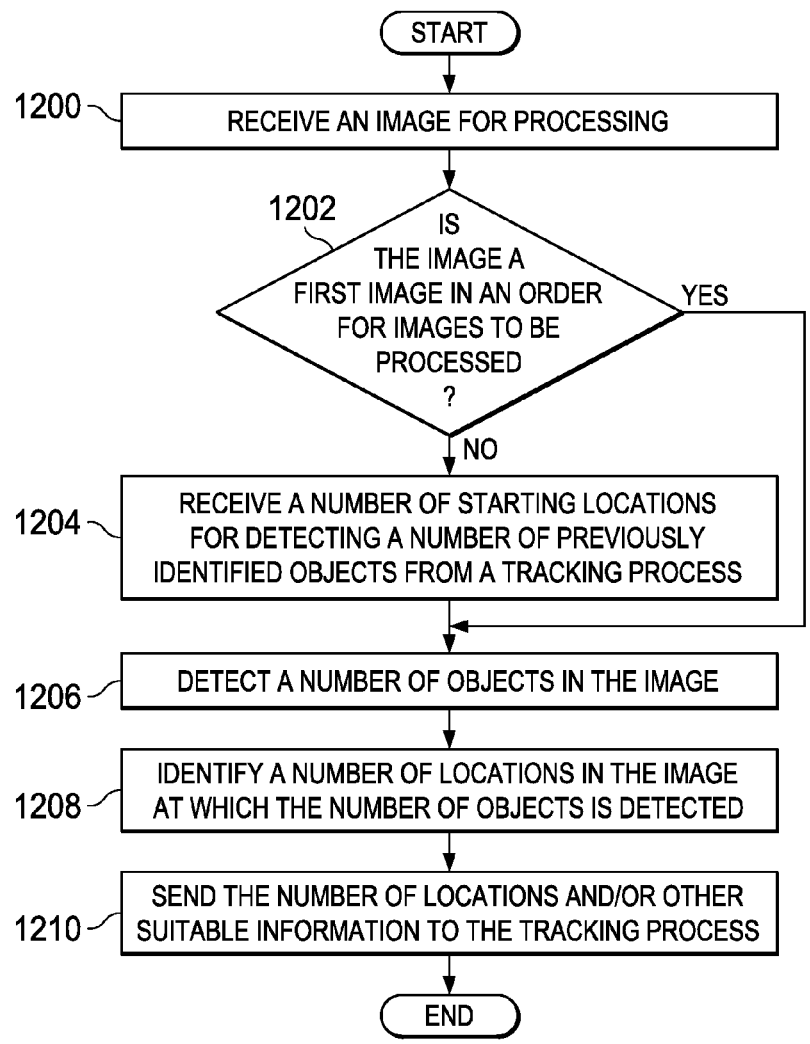
FIG. 12 is an illustration of a flowchart of a process for detecting objects in images in accordance with an advantageous embodiment.

With reference now to FIG. 12, an illustration of a flowchart of a process for detecting objects in images is depicted in accordance with an advantageous embodiment. The process illustrated in FIG. 12 may be implemented using global search process 304 in object tracking process 300 in FIG. 3. This process may be a more-detailed process for operation 1100 in FIG. 11.

The process begins by receiving an image for processing (operation 1200). The process determines whether the image is a first image in an order for images to be processed (operation 1202). If the image is not a first image, the process receives a number of starting locations for detecting a number of previously identified objects from a tracking process (operation 1204).

Thereafter, the process detects a number of objects in the image (operation 1206). In operation 1206, some, all, or none of the objects detected may have been previously identified. Next, the process identifies a number of locations in the image at which the number of objects is detected (operation 1208).

Thereafter, the process sends the number of locations and/or other suitable information to the tracking process (operation 1210), with the process terminating thereafter. With reference again to operation 1202, if the image is a first image, the process proceeds to operation 1206, as described above.

Figure 13:
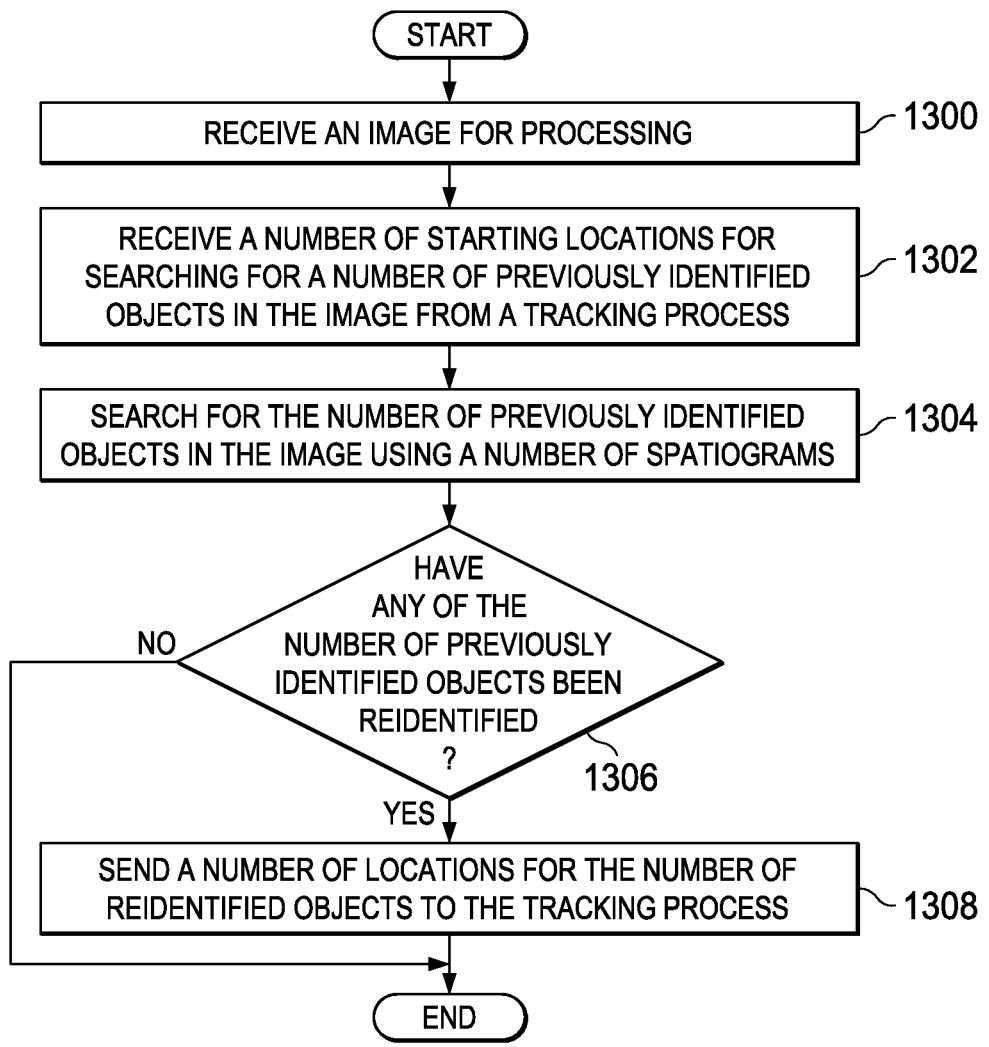
FIG. 13 is an illustration of a flowchart of a process for searching for objects in images in accordance with an advantageous embodiment.

With reference now to FIG. 13, an illustration of a flowchart of a process for searching for objects in images is depicted in accordance with an advantageous embodiment. The process illustrated in FIG. 13 may be implemented using local search process 306 in object tracking process 300 in FIG. 3. This process may be a more-detailed process for operation 1102 in FIG. 11.

The process begins by receiving an image for processing (operation 1300). The process then receives a number of starting locations for searching for a number of previously identified objects in the image from a tracking process (operation 1302).

Thereafter, the process searches for the number of previously identified objects in the image using a number of spatiograms (operation 1304). Next, the process determines whether any of the number of previously identified objects have been reidentified (operation 1306). In operation 1306, a previously identified object is reidentified when a spatiogram generated at a location in the image matches a reference spatiogram associated with the previously identified object.

If no previously identified objects have been reidentified, the process terminates. Otherwise, if any of the number of previously identified objects have been reidentified, the process sends a number of locations for the number of reidentified objects to the tracking process (operation 1308), with the process terminating thereafter.

Figure 14B:
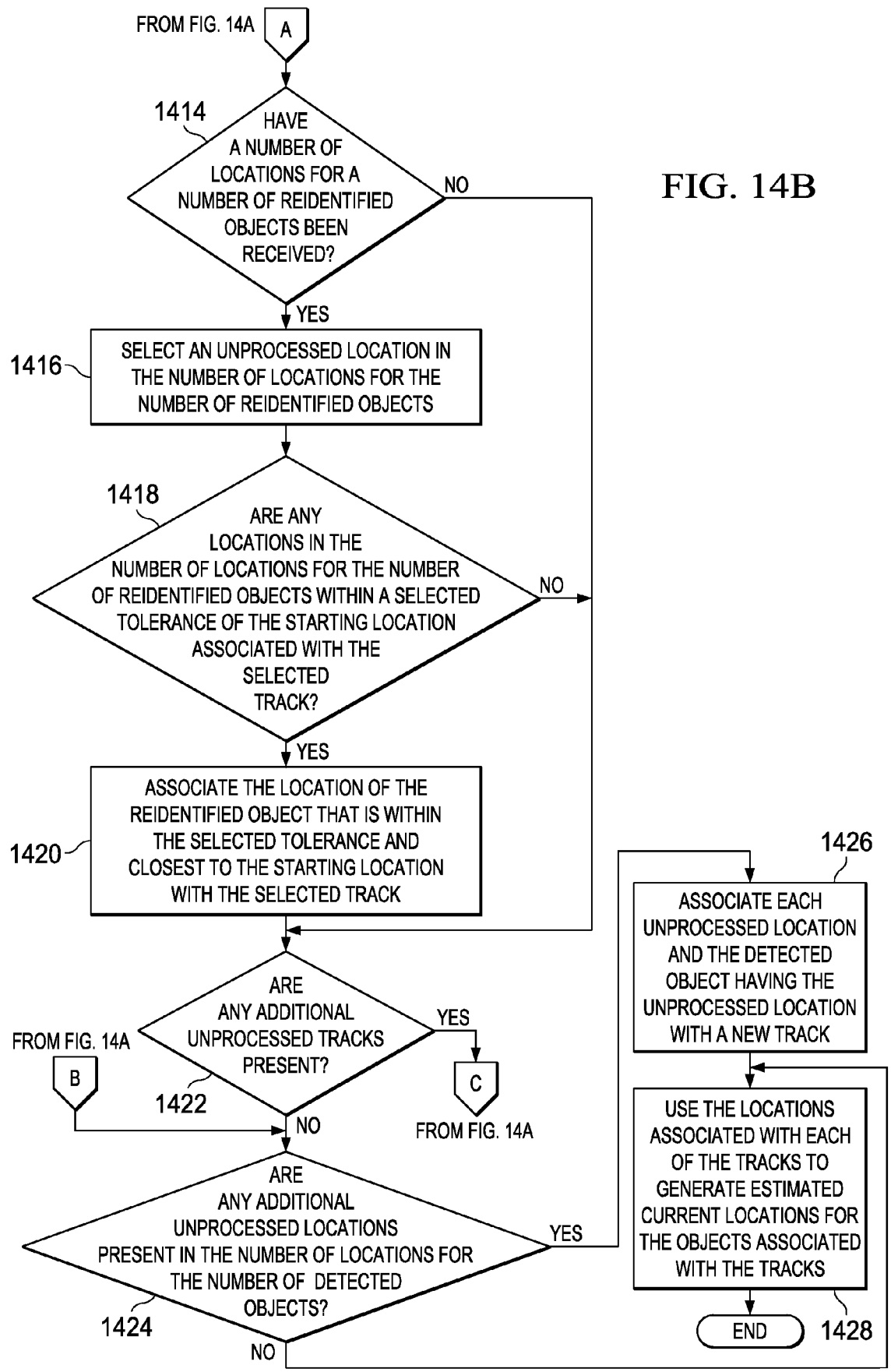

With reference now to FIGS. 14A and 14B, illustrations of a flowchart of a process for tracking objects in images is depicted in accordance with an advantageous embodiment. The process illustrated in FIGS. 14A and 14B may be implemented using tracking process 308 in object tracking process 300 in FIG. 3. This process may be a more-detailed process for operation 1104 in FIG. 11.

The process begins by identifying at least one of a number of locations for a number of detected objects, a number of locations for a number of reidentified objects, and a number of starting locations for a number of previously identified objects (operation 1400). The number of reidentified objects may include some or all of the number of previously identified objects. These locations are locations identified for an image.

In this illustrative example, in operation 1400, the number of locations for the number of detected objects is obtained from a global search process, such as global search process 304 in FIG. 3. Further, the number of locations for the number of reidentified objects is obtained from a local search process, such as local search process 306 in FIG. 3. Additionally, each of the number of starting locations is a location for a previously identified object associated with a track by the tracking process.

Thereafter, the process determines whether any tracks for objects are present (operation 1402). Tracks are present for objects when the objects have been previously identified. Each track is associated with a previously identified object and is also associated with a starting location for the previously identified object. The starting location is the location at which the global search process and the local search process begin searching for the previously identified object in the image. In other words, starting locations for previously identified objects are only identified in operation 1400 when tracks are present for the previously identified objects.

If any tracks for objects are present, the process selects a track for processing (operation 1404). The process then determines whether a number of locations for a number of detected objects have been obtained (operation 1406). If a number of locations for a number of detected objects have been obtained, the process selects an unprocessed location in the number of locations for the number of detected objects (operation 1408). In these examples, an unprocessed location is a location that has not been associated with a track.

Thereafter, the process determines whether any locations in the number of locations for the number of detected objects are within a selected tolerance of the starting location associated with the selected track (operation 1410). The selected tolerance may be, for example, a selected distance from the starting location. Additionally, the selected tolerance may be values within a tolerance from a center, an angle, a height, and/or a width included in the starting location. If any locations in the number of locations for the number of detected objects are within the selected tolerance, the process associates the location of the detected object that is within the selected tolerance and closest to the starting location with the selected track (operation 1412).

Next, the process determines whether a number of locations for a number of reidentified objects have been received (operation 1414). If a number of locations for the number of reidentified objects have been received, the process selects an unprocessed location in the number of locations for the number of reidentified objects (operation 1416).

Thereafter, the process determines whether any locations in the number of locations for the number of reidentified objects are within a selected tolerance of the starting location associated with the selected track (operation 1418). The selected tolerance in operation 1418 may or may not be the same as the selected tolerance described in operation 1410. If any locations in the number of locations for the number of reidentified objects are within the selected tolerance, the process associates the location of the reidentified object that is within the selected tolerance and closest to the starting location with the selected track (operation 1420).

Then, the process determines whether any additional unprocessed tracks are present (operation 1422). If additional unprocessed tracks are present, the process returns to operation 1404 as described above. Otherwise, the process determines whether any additional unprocessed locations are present in the number of locations for the number of detected objects (operation 1424). If additional unprocessed locations are present in the number of locations for the number of detected objects, the process associates each unprocessed location and the detected object having the unprocessed location with a new track (operation 1426).

Thereafter, the process uses the locations associated with each of the tracks to generate estimated current locations for the objects associated with the tracks (operation 1428), with the process terminating thereafter. Operation 1428 is performed for the tracks associated with the previously identified objects and for the new tracks.

The estimated current locations generated in operation 1428 are used as the starting locations for the global search process and the local search process in a subsequent image. If the track is a new track, the estimated current location for the track is the location at which the object was detected by the global search process.

With tracks for previously identified objects, if a track is associated with only a starting location for the previously identified object, that location is sent into a Kalman filter to generate the estimated current location for the track. However, if the track is associated with a location at which the object was detected and/or a location at which the object was reidentified, these locations, along with the starting location for the track, are sent into the Kalman filter to generate the estimated current location. In this manner, zero, one, or two input locations may be sent into the Kalman filter to generate an estimated current location for a track.

With reference again to operation 1424, if additional unprocessed locations are not present in the number of locations for the number of detected objects, the process proceeds to operation 1428 as described above.

With reference again to operation 1418, if no locations in the number of locations for the number of reidentified objects are within the selected tolerance, the process then proceeds to operation 1422 as described above. With reference again to operation 1414, if a number of locations for the number of reidentified objects have not been received, the process also proceeds to operation 1422 as described above.

With reference again to operation 1410, if no locations in the number of locations for the number of detected objects are within the selected tolerance, the process proceeds to operation 1414 as described above. With reference again to operation 1406, if a number of locations for a number of detected objects have not been obtained, the process also proceeds to operation 1414 as described above. Additionally, with reference again to operation 1402, if no tracks for objects are present, the process proceeds to operation 1424 as described above.

Figure 15:
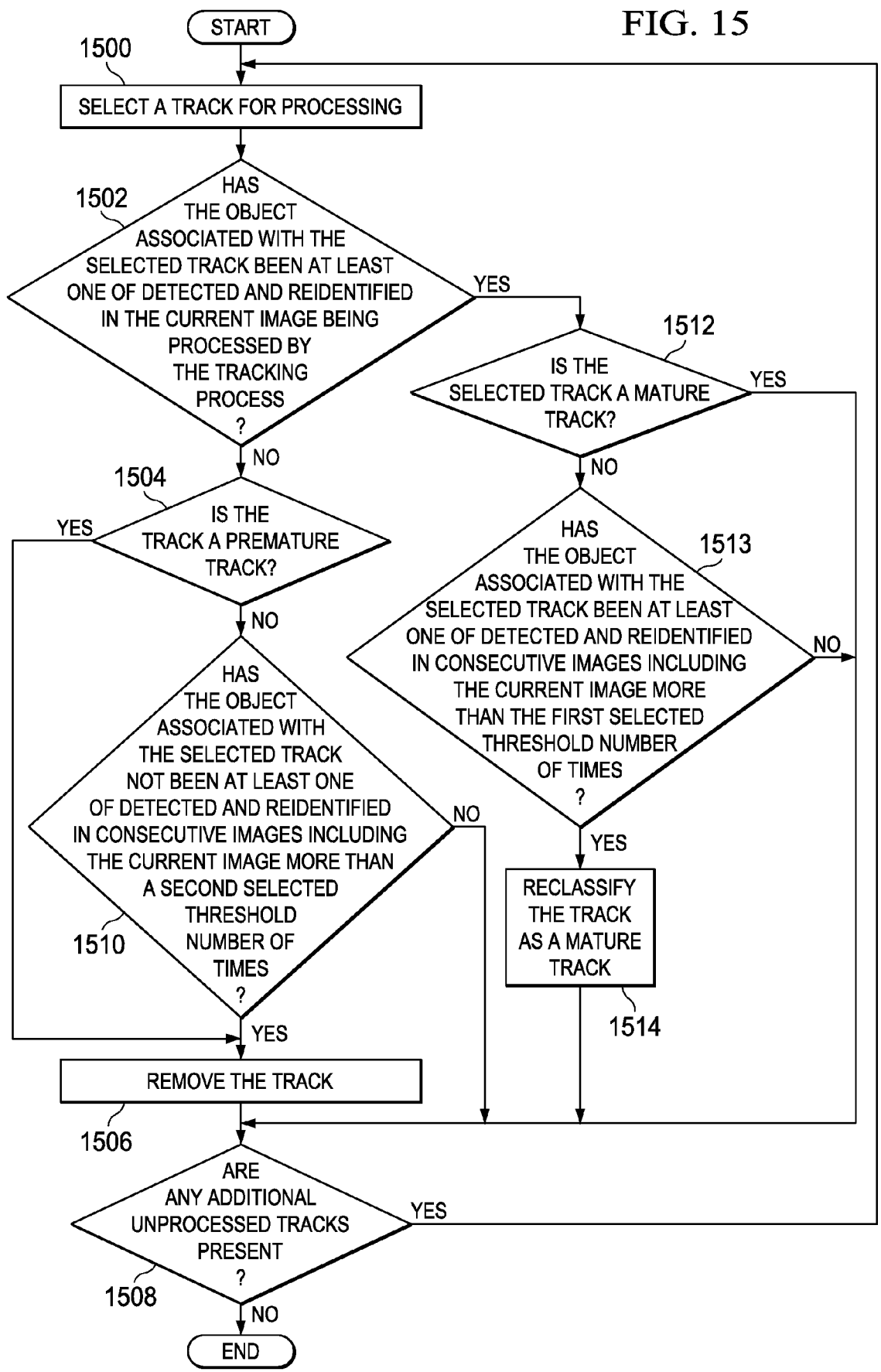
FIG. 15 is an illustration of a flowchart of a process for managing tracks for objects in accordance with an advantageous embodiment.

Turning now to FIG. 15, an illustration of a flowchart of a process for managing tracks for objects is depicted in accordance with an advantageous embodiment. The process illustrated in FIG. 15 may be implemented using tracking process 308 in object tracking process 300 in FIG. 3. This process may be performed after the process described in FIGS. 14A and 14B. Further, this process may be performed for tracks for previously identified objects and for new tracks.

The process begins by selecting a track for processing (operation 1500). The process then determines whether the object associated with the selected track has been at least one of detected and reidentified in the current image being processed by the tracking process (operation 1502).

If the object associated with the selected track has not been at least one of detected and reidentified in the current image, the process determines whether the track is a premature track (operation 1504). A premature track is a track in which the object associated with the track has been at least one of detected and reidentified in consecutive images processed prior to the current image less than or equal to a first selected threshold number of times. This first selected threshold number of times may be, for example, three times.

If the track is a premature track, the process removes the track (operation 1506). The removal of a track results in the object associated with the removed track no longer being considered as previously identified. Thereafter, the process determines whether any additional unprocessed tracks are present (operation 1508). If additional unprocessed tracks are not present, the process terminates. Otherwise, the process returns to operation 1500 as described above.

With reference again to operation 1504, if the track is not a premature track, the process determines whether the object associated with the selected track has not been at least one of detected and reidentified in consecutive images including the current image more than a second selected threshold number of times (operation 1510).

In this example, if the track is not a premature track, the track is a mature track. A mature track is a track for which the object associated with the track has been at least one of detected and reidentified in consecutive images processed prior to the current image more than the first selected threshold number of times.

With reference to operation 1510, if the object associated with the selected track has not been at least one of detected and reidentified in consecutive images including the current image more than the second selected threshold number of times, the process proceeds to operation 1506 as described above. Otherwise, in operation 1510, if the object associated with the selected track has not been at least one of detected and reidentified in consecutive images including the current image less than or equal to the second selected threshold number of times, the process proceeds to operation 1508 as described above.

With reference again to operation 1502, if the object associated with the selected track has been at least one of detected and reidentified in the current image, the process determines whether the selected track is a mature track (operation 1512).

If the selected track is not a mature track, the process determines whether the object associated with the selected track has been at least one of detected and reidentified in consecutive images including the current image more than the first selected threshold number of times (operation 1513).

If the object associated with the selected track has been at least one of detected and reidentified in consecutive images including the current image more than the first selected threshold number of times, the process reclassifies the track as a mature track (operation 1514). Thereafter, the process continues to operation 1508 as described above.

With reference again to operation 1513, if the object associated with the selected track has been at least one of detected and reidentified in consecutive images including the current image less than or equal to the first selected threshold number of times, the process proceeds to operation 1508 as described above. With reference again to operation 1512, if the track is a mature track, the process continues to operation 1508 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for tracking objects. In one advantageous embodiment, a number of objects is detected in an image to form a number of detected objects. A number of previously identified objects is searched for in the image using a number of signatures for the number of previously identified objects. A number of tracks for the objects is updated using the number of detected objects and a number of reidentified objects. The number of additional objects is from searching for the number of previously identified objects.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for tracking objects, the method comprising:
    detecting a number of objects in an image to form a number of detected objects;
    searching for a number of previously identified objects in the image using a number of signatures for the number of previously identified objects;
    updating a number of tracks for the objects using the number of detected objects and a number of reidentified objects, wherein the number of reidentified objects is from searching for the number of previously identified objects;
    responsive to an object associated with a track of the number of tracks being at least one of a detected and reidentified in the image, the track not being a mature track, and the object associated with the track being at least one of detected and reidentified in consecutive images including the image more than a first selected threshold number of times, reclassifying the track as a mature track;

responsive to an object not associated with a track of the number of tracks being at least one of a detected and reidentified in the image, and the track not being a mature track, removing the track; and responsive to an object not associated with a track of the number of tracks being at least one of a detected and reidentified in the image, the track being a mature track, and the object associated with the track not being at least one of detected and reidentified in consecutive images including the image more than a second selected threshold number of times, removing the track.

2. The method of claim 1 further comprising:
updating the number of tracks for the objects using any previously identified object not found during searching for the number of previously identified objects.

3. The method of claim 2 further comprising:
updating the number of tracks for the objects using one of any object detected in the image during detecting the number of objects in the image and the any previously identified object found from searching for the number of previously identified objects.

4. The method of claim 1 further comprising:
responsive to a new object being present in the number of detected objects, identifying a number of values for a number of attributes for the object from the image to form a signature for the new object.

5. The method of claim 4, wherein the step of responsive to the new object being present in the number of detected objects, identifying the number of values for the number of attributes for the object from the image to form the signature for the new object comprises:
responsive to the new object being present in the number of detected objects, creating a new track for the new object; and
identifying the number of values for the number of attributes for the object from the image to form the signature for the new object after the new track is created.

6. The method of claim 1, wherein an object is at least one of a detected object in the number of detected objects, a previously identified object in the number of previously identified objects, and a reidentified object in the number of reidentified objects, and wherein the step of updating the number of tracks for the objects using the number of detected objects and the number of reidentified objects, wherein the number of reidentified objects is from searching for the number of previously identified objects comprises:
updating a track for the object by sending at least one of a starting location for the previously identified object, a first location for the detected object, and a second location for the reidentified object to a Kalman filter in which the Kalman filter is configured to generate an estimated current location for the object in the image.

7. The method of claim 1 further comprising:
identifying a number of estimated current locations for the number of objects associated with the number of tracks using a Kalman filter.

8. The method of claim 1, wherein the step of searching for the number of previously identified objects in the image using the number of signatures for the number of previously identified objects comprises:
searching for the number of previously identified objects in the image using the number of signatures for the number of previously identified objects and a number of starting locations to search for the number of previously identified objects.

9. The method of claim 1, wherein the step of updating the number of tracks for the objects using the number of detected objects and the number of reidentified objects, wherein the number of reidentified objects is from searching for the number of previously identified objects comprises:
determining whether any of the number of detected objects is associated with the number of tracks for the objects;
responsive to a determination that a detected object in the number of detected objects is associated with a track in the number of tracks, updating the track associated with the detected object using a first location for the detected object in the image; and
responsive to a determination that the detected object is not associated with any of the number of tracks for the objects, creating a new track in the number of tracks for the detected object in which the new track comprises a current location for the detected object in the image.

10. The method of claim 1, wherein a track in the number of tracks is associated with an object being tracked and comprises an identification of the object, a current location of the object in the image, and a prior location of the object in the image.

11. The method of claim 1, wherein the step of updating the number of tracks for the objects using the number of detected objects and the number of reidentified objects, wherein the number of reidentified objects is from searching for the number of previously identified objects comprises:
determining whether a track in the number of tracks is not associated with at least one of a detected object in the number of detected objects and a reidentified object in the number of reidentified objects;
responsive to a determination that the track in the number of tracks is not associated with the at least one of the detected object in the number of detected objects and the reidentified object in the number of reidentified objects, determining whether a length of time that has passed since the track has been associated with the at least one of the detected object in the number of detected objects and the reidentified object in the number of reidentified objects is greater than a selected threshold; and
responsive to the determination that the length of time that has passed since the track has been associated with the at least one of the detected object in the number of detected objects and the reidentified object in the number of reidentified objects is greater than the selected threshold, removing the track from the number of tracks.

12. The method of claim 1, wherein the number of signatures is a number of spatiograms.

13. An apparatus comprising:
a sensor system configured to generate images of an area; and
a computer system wherein the computer system is configured to
detect a number of objects in an image to form a number of detected objects;
search for a number of previously identified objects in the image using a number of signatures for the number of previously identified objects;
update a number of tracks for the number of objects using the number of detected objects and a number of reidentified objects from searching for the number of previously identified objects;
responsive to an object associated with a track of the number of tracks being at least one of a detected and reidentified in the image, the track not being a mature track, and the object associated with the track being at least one of detected and reidentified in consecutive images including the image more than a first selected threshold number of times, reclassifying the track as a mature track;

responsive to an object not associated with a track of the number of tracks being at least one of a detected and reidentified in the image, and the track not being a mature track, removing the track; and responsive to an object not associated with a track of the number of tracks being at least one of a detected and reidentified in the image, the track being a mature track, and the object associated with the track not being at least one of detected and reidentified in consecutive images including the image more than a second selected threshold number of times, removing the track.

14. The apparatus of claim 13, wherein the apparatus is an unmanned aerial vehicle.

15. The apparatus of claim 13 further comprising:
a platform, wherein the sensor system and the computer system are associated with the platform.

16. The apparatus of claim 13, wherein the computer system comprises:
a processor unit; and
an object tracking process configured to run on the processor unit to detect the number of objects in the image to form the number of detected objects; search for the number of previously identified objects in the image using the number of signatures for the number of previously identified objects; and update the number of tracks for the number of objects using the number of detected objects and the number of reidentified objects from searching for the number of previously identified objects.

17. The apparatus of claim 16, wherein the object tracking process comprises:
a global search process configured to detect the number of objects in the image to form the number of detected objects;
a local search process configured to search for the number of previously identified objects in the image using the number of signatures for the number of previously identified objects; and
a tracking process configured to update the number of tracks for the number of objects using the number of detected objects and the number of reidentified objects from searching for the number of previously identified objects.

18. The apparatus of claim 13, wherein in being configured to update the number of tracks for the number of objects using the number of detected objects and the number of reidentified objects, the computer system is configured to identify a new starting location in the image to search for each object in the number of detected objects and the number of reidentified objects using a history of locations for the each object to form a new number of starting locations to search for the number of detected objects and the number of reidentified objects.

19. The apparatus of claim 13,
wherein in being configured to search for the number of previously identified objects in the image using the number of signatures for the number of previously identified objects, the computer system is configured to search for the number of previously identified objects in the image using the number of signatures for the number of previously identified objects and a number of starting locations to search for the number of previously identified objects;
wherein the computer system is further configured to identify a second number of signatures for the number of detected objects and the number of reidentified objects; and identify a new number of starting locations for the number of objects and the number of reidentified objects to search for the number of objects and the number of reidentified objects; and search for the number of detected objects and the number of reidentified objects in a subsequent image to the image using the second number of signatures and the new number of starting locations; and
wherein the number of signatures is a number of spatiograms.

* * * * *